US009264699B2

(12) United States Patent
Jung et al.

(10) Patent No.: US 9,264,699 B2
(45) Date of Patent: Feb. 16, 2016

(54) DISPLAY APPARATUS AND METHOD OF DRIVING THE SAME

(75) Inventors: Kwang-Chul Jung, Seongnam-si (KR);
Chong-Chul Chai, Seoul (KR);
Yeong-Keun Kwon, Yongin-si (KR);
Se-Young Song, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 659 days.

(21) Appl. No.: 13/340,258

(22) Filed: Dec. 29, 2011

(65) Prior Publication Data

US 2012/0236043 A1 Sep. 20, 2012

(30) Foreign Application Priority Data

Mar. 18, 2011 (KR) .................. 10-2011-0024324

(51) Int. Cl.
*G09G 3/36* (2006.01)
*G09G 5/10* (2006.01)
*H04N 13/04* (2006.01)
*G02B 27/22* (2006.01)
*G09G 3/00* (2006.01)

(52) U.S. Cl.
CPC .......... *H04N 13/042* (2013.01); *G02B 27/2214* (2013.01); *G09G 3/003* (2013.01); *H04N 13/0452* (2013.01); *G02B 2207/113* (2013.01); *G09G 3/3611* (2013.01); *G09G 2300/023* (2013.01)

(58) Field of Classification Search
None
See application file for complete search history.

(56) References Cited

U.S. PATENT DOCUMENTS

| 7,697,109 | B2 | 4/2010 | Yun et al. | |
| 2006/0164593 | A1 | 7/2006 | Peyghambarian et al. | |
| 2007/0183015 | A1* | 8/2007 | Jacobs et al. | 359/245 |
| 2009/0190048 | A1 | 7/2009 | Hong et al. | |
| 2009/0224646 | A1* | 9/2009 | Kim et al. | 313/245 |
| 2011/0084961 | A1* | 4/2011 | Son et al. | 345/419 |
| 2011/0102689 | A1* | 5/2011 | Chiu | 349/15 |
| 2011/0157496 | A1* | 6/2011 | Im | 349/15 |
| 2012/0105750 | A1* | 5/2012 | Yoon et al. | 349/15 |
| 2012/0162592 | A1* | 6/2012 | Takagi et al. | 349/139 |

FOREIGN PATENT DOCUMENTS

JP 2000-102038 4/2000

* cited by examiner

*Primary Examiner* — Christopher R Lamb
(74) *Attorney, Agent, or Firm* — Innovation Counsel LLP

(57) ABSTRACT

A display apparatus includes a panel module displaying a 2-dimensional (2D) image or a 3-dimensional (3D) stereoscopic image, a lens panel disposed over the panel module and including a first substrate, a second substrate and a liquid crystal layer disposed between the first substrate and the second substrate, the first substrate including a plurality of first electrodes, a plurality of floating electrodes and a plurality of second electrodes, the floating electrodes partially overlapping with the first electrodes and being electrically floated, the second electrodes partially overlapping with the floating electrodes, and a light source module supplying light to the panel module.

32 Claims, 12 Drawing Sheets

<2D MODE>

<3D MODE>

DISPLAY APPARATUS AND METHOD OF DRIVING THE SAME

CROSS-REFERENCE TO RELATED APPLICATION

This application claims priority under 35 U.S.C. §119 to Korean Patent Application No. 2011-0024324, filed on Mar. 18, 2011, in the Korean Intellectual Property Office (KIPO), the contents of which are herein incorporated by reference in their entireties.

BACKGROUND OF THE INVENTION

1. Field of the Invention

Example embodiments of the present invention relate to a display apparatus and a method of driving the display apparatus. More particularly, example embodiments of the present invention relate to a display apparatus displaying a 2-dimensional (2D) image and a 3-dimensional (3D) stereoscopic image and a method of driving the display apparatus.

2. Discussion of the Related Art

As demand for a 3D stereoscopic images has increased in industrial fields such as cinema, gaming, and so on, a stereoscopic image display apparatus displaying the 3D stereoscopic image has been improved. The stereoscopic image display apparatus displays the 3D stereoscopic image by respectively providing 2D images different from each other to left and right eyes of an observer. Thus, the observer recognizes a pair of two different 2D images, and the pair of two different 2D images is mixed in a brain of the observer, so that the observer may perceive the 3D stereoscopic image.

A stereoscopic image display apparatus is classified as a stereoscopic type or an auto-stereoscopic type according to whether or not the observer wears special glasses. Conventionally, the auto-stereoscopic type such as a barrier type, a lenticular type and so on is used for a flat display apparatus.

In the lenticular type, the light passing through the left and right pixels is refracted using a lens, so that the 3D stereoscopic image may be displayed. The brightness in the lenticular type may be larger than that in the barrier type because most of the light passes through the lens.

The lens used in the lenticular type may be a convex lens or a Fresnel lens. A thickness of the Fresnel lens is thinner than that of the convex lens. The Fresnel lens includes a plurality of circular arcs on a surface of the Fresnel lens and a plurality of discontinuous lines formed at boundaries between the circular arcs. The Fresnel lens refracts light at the circular arcs and concentrates the light at one point.

When a lens panel operates like the Fresnel lens by applying voltages to a plurality of electrodes, the thickness of the lens decreases as the number of the electrodes increases. As the number of the electrodes increases, however, the distance between the lines applying the voltage to the electrodes decreases, so that a resistance may be increased and a disconnection of the lines may occur.

SUMMARY OF THE INVENTION

Example embodiments of the present invention provide a display apparatus capable of decreasing a thickness of a lens panel and increasing a distance between lines to enhance a response rate and reliability.

Example embodiments of the present invention also provide a method of driving the display apparatus.

According to an example embodiment of the present invention, a display apparatus includes a panel module displaying a 2-dimensional (2D) image or a 3-dimensional (3D) stereoscopic image, a lens panel disposed over the panel module and including a first substrate, a second substrate and a liquid crystal layer disposed between the first substrate and the second substrate, the first substrate including a plurality of first electrodes, a plurality of floating electrodes and a plurality of second electrodes. The floating electrodes partially overlap with the first electrodes and are electrically floated. The second electrodes partially overlap with the floating electrodes. A light source module supplies light to the panel module.

In an example embodiment, a voltage applied to each of the first electrodes may be smaller than a voltage applied to each of the second electrodes.

In an example embodiment, the first substrate may include a first insulating layer formed between the first electrodes and the floating electrodes, and a second insulating layer formed between the second electrodes and the floating electrodes.

In an example embodiment, voltages of the floating electrodes may be between a voltage applied to each of their respective first electrodes and a voltage applied to each of their respective second electrodes.

In an example embodiment, the voltages of the floating electrodes may increase according as a portion of the first electrodes overlapping with the floating electrodes or a portion of the second electrodes overlapping with the floating electrodes increases.

In an example embodiment, the voltages of the floating electrodes may decrease according as a thickness of the first insulating layer or a thickness of the second insulating layer increases.

In an example embodiment, the lens panel may further include a lens driving circuit formed on at least one side of the first substrate, and a plurality of bus lines connected to the lens driving circuit and transmitting voltages to the first electrodes and the second electrodes.

In an example embodiment, at least two second electrodes may be connected to the bus lines different from each other.

In an example embodiment, the lens driving circuit may include first and second driving circuits, and the bus lines may be alternately connected to the first and second driving circuits.

In an example embodiment, the lens driving circuit may include a plurality of driving circuits, and the bus lines are connected to all of the driving circuits.

In an example embodiment, the lens panel may further include a plurality of bus lines directly connected to an external circuit substrate, and transmitting voltages to the first and second electrodes.

In an example embodiment, at least two second electrodes may be electrically connected to the bus lines different from each other.

In an example embodiment, the second electrodes may be electrically connected to substantially the same bus line.

In an example embodiment, the first electrodes, the second electrodes and the floating electrodes may form a plurality of lens units, and widths of shorter sides of the first electrodes, the second electrodes and the floating electrodes may increase as the first electrodes, the second electrodes and the floating electrodes approach a center of each of the lens units.

In an example embodiment, the width of the shorter side of each of the second electrodes may be shorter than that of each of the corresponding first electrodes.

According to an example embodiment of the present invention, a method for driving a display apparatus includes providing light from a light source module to a panel module to display an image. Voltages different from each other are applied to first electrodes and second electrodes of the lens panel, and the lens panel is disposed over the panel module. Voltages are applied to a plurality of floating electrodes of a first substrate, wherein the voltages applied depend on the voltages applied to the first electrodes and the second electrodes. The floating electrodes partially overlap with the first electrodes respectively, partially overlap with the second electrodes respectively, and are electrically floated. An arrangement of liquid crystal molecules of a liquid crystal layer of the lens panel is changed, and the liquid crystal layer is disposed between the first substrate and a second substrate. The image provided from the panel module is refracted in passing through the liquid crystal layer of the lens panel.

In an example embodiment, changing the arrangement of the liquid crystal molecules of the liquid crystal layer may include forming an electric field between the first electrodes, the floating electrodes and the second electrodes of the first substrate and a common electrode of the second substrate.

In an example embodiment, the voltage applied to each of the first electrodes may be smaller than the voltage applied to each of the corresponding second electrodes, and the voltages of the floating electrodes may be between the voltage applied to the first electrode and the voltage applied to the second electrode.

In an example embodiment, at least two voltages applied to the second electrodes may be different from each other.

In an example embodiment, the voltages applied to the second electrodes may be substantially the same.

According to example embodiments of the present invention, the lens unit of the lens panel is driven as a Fresnel lens, so that a cell gap of the lens panel is decreased. Thus, manufacturing efficiency is enhanced, and manufacturing cost is decreased.

The number of the bus lines and electrode lines formed in a peripheral area of the lens panel is decreased due to forming a plurality of electrodes electrically floated in the lens panel, so that resistors and disconnection of the bus lines or the electrode lines are decreased. In addition, a distance between the bus lines or the electrode lines is increased, so that the manufacturing process is much easier.

The lens panel receives the driving voltages from the connector like a flexible printed circuit board (FPCB) without a driving circuit including chips as a driving IC chip, so that the manufacturing cost is decreased.

BRIEF DESCRIPTION OF THE DRAWINGS

The above and other features of the present invention will become more apparent by describing in detail example embodiments thereof with reference to the accompanying drawings, in which.

DETAILED DESCRIPTION OF EXAMPLE EMBODIMENTS

Hereinafter, the present invention will be explained in detail with reference to the accompanying drawings.

Figure 1:
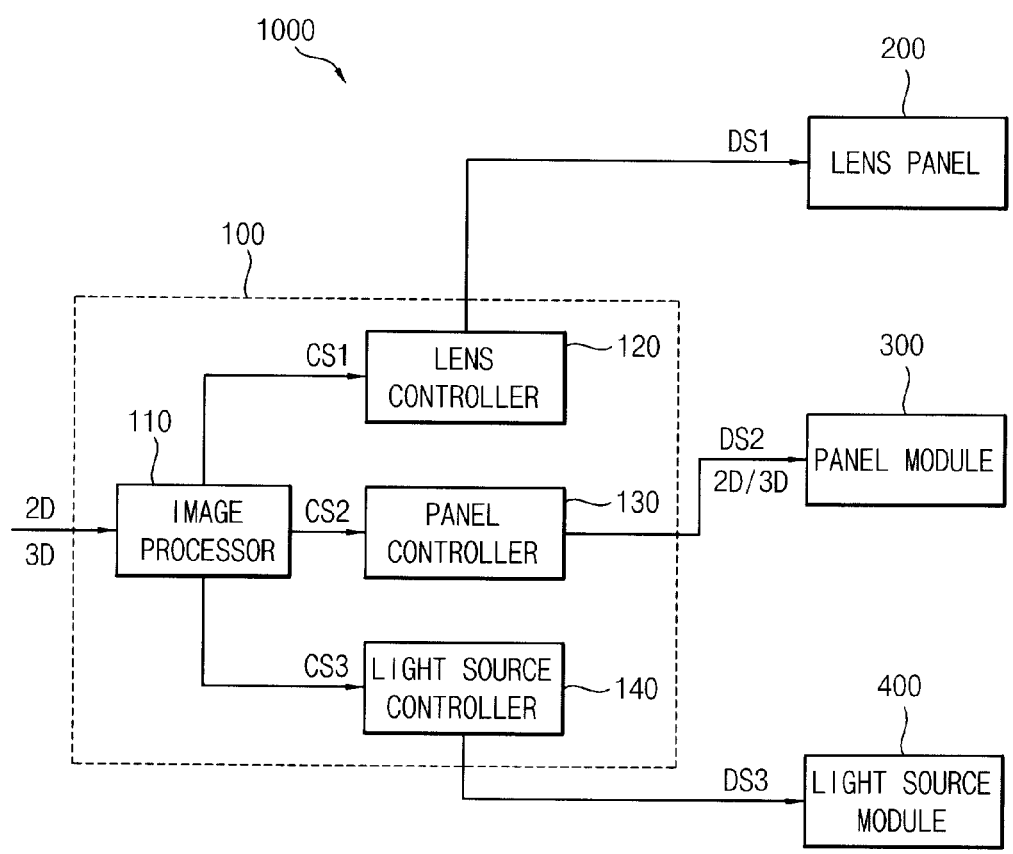
FIG. 1 is a block diagram illustrating a display apparatus according to an example embodiment of the present invention.
Figure 2:
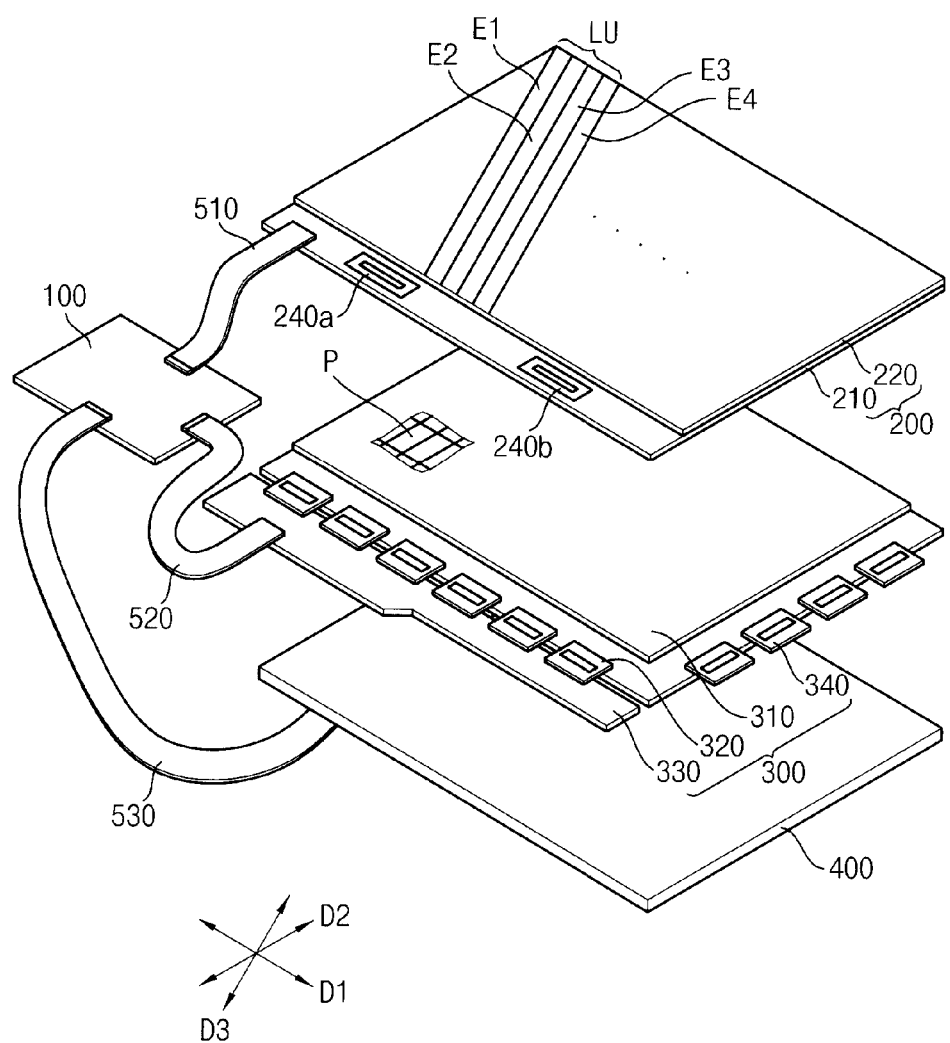
FIG. 2 is an exploded perspective view illustrating the display apparatus in FIG. 1.

FIG. 1 is a block diagram illustrating a display apparatus according to an example embodiment of the present invention. FIG. 2 is an exploded perspective view illustrating the display apparatus in FIG. 1.

Referring to FIGS. 1 and 2, the display apparatus 1000 includes a controller 100, a lens panel 200, a panel module 300 and a light source module 400.

The controller 100 receives a 2D image or a 3D stereoscopic image from outside, and controls the display apparatus 1000 to display said 2D image or said 3D stereoscopic image.

The controller 100 includes an image processor 110, a lens controller 120, a panel controller 130 and a light source controller 140. The controller 100 may further include a timing controller (not shown). The timing controller controls signals from a lens controller 120, a panel controller 130 and a light source controller 140, and outputs the signals.

The image processor 110 generates control signals CS1, CS2 and CS3 according to a mode of the display apparatus 1000.

The image processor 110 provides the first control signal CS1 to the lens controller 120. For example, the first control signal CS1 may be a control signal deciding whether or not the lens part 100 is driven as a Fresnel lens. The image processor 110 provides the second control signal CS2 and a 2D image or a 3D stereoscopic image to the panel controller 130. For example, the second control signal CS2 may be a control signal deciding whether or not the panel module 300 displays the 3D stereoscopic image. The image processor 110 provides the third control signal CS3 to the light source controller 140. For example, the third control signal CS3 may be a control signal which determines a brightness of the light source module 400. In a 2D mode, the light source controller 140 supplies the light with a first brightness. In a 3D mode, the light source controller 140 supplies the light with a second brightness which is larger than the first brightness.

The lens controller 120 provides a first driving signal DS1 based on the first control signal CS1 to the lens panel 200. The first driving signal DS1 may include driving voltages which are provided to the lens panel 200.

The panel controller 130 provides a second driving signal DS2 and a 2D image or a 3D stereoscopic image to the panel module 300 based on the second control signal CS2. The second driving signal DS2 may include a data voltage, a vertical start signal, a reverse signal and an output enable signal which are provided to the data circuit part 320. In addition, the second driving signal DS2 may include a vertical start signal, a gate clock signal and an output enable signal which are provided to the gate circuit part 340.

The light source controller 140 provides a third driving signal DS3 to the light source module 400 based on the third control signal CS3. In the 3D mode, the third driving signal DS3 may increase the brightness of the light source module 400 compared to the 2D mode.

According to the present example embodiment, the image processor 110, the lens controller 120, the panel controller 130 and the light source controller 140 are disposed on one substrate. Alternatively, the above-mentioned elements may be disposed on separated substrates.

The lens panel 200 includes a relatively longer side substantially parallel with a first direction D1 and a relatively shorter side substantially parallel with a second direction D2. The lens panel 200 includes a plurality of lens units LU and lens driving circuit parts 240a and 240b. The lens panel 200 includes a plurality of first electrodes E1, a plurality of second electrodes E2, a plurality of third electrodes E3 and a plurality of fourth electrodes E4 sequentially disposed, a common electrode (not shown) facing the first electrodes E1, the second electrodes E2, the third electrodes E3 and the fourth electrodes E4, and a liquid crystal layer disposed between the first, second, third and fourth electrodes E1, E2, E3 and E4 and the common electrode. Although not shown in FIG. 2, the first, second, third and fourth electrodes E1, E2, E3 and E4 partially overlap with each other.

The first, second, third and fourth electrodes E1, E2, E3 and E4 extend along a third direction D3 crossing the first and second directions D1 and D2. The lens driving circuit parts 240a and 240b are disposed at a side of a first substrate 210, and electrically connected with the first and fourth electrodes E1 and E4 respectively. When the lens units LU are driven as the Fresnel lens, the lens driving circuit parts 240a and 240b supply first and fourth voltages to the first and fourth electrodes E1 and E4, respectively.

The lens panel 200 may be driven in a 2-dimensional (2D) mode or a 3-dimensional (3D) mode. For example, when the display apparatus 1000 displays a 3D stereoscopic image, the first voltages are applied to each of the first electrodes E1, and the fourth voltages are applied to each of the fourth electrodes E4. The second and third electrodes E2 and E3 are electrically floated to have second and third voltages between the first and fourth voltages, respectively. Thus, an arrangement of the liquid crystal molecules of the liquid crystal layer is changed, and the lens units LU are driven as a Fresnel lens to refract light from display panel 310, so that an observer perceives the 3D stereoscopic image.

The panel module 300 includes the display panel 310, a data circuit part 220, a source printed circuit board 330 and a gate circuit part 340. The display panel 310 includes a relatively longer side substantially parallel with a first direction D1 and a relatively shorter side substantially parallel with a second direction D2 crossing the first direction D1. The display panel 310 includes a plurality of pixels P.

The data circuit part 320 applies a data voltage to the pixel P, and is electrically connected to the source printed circuit board 330. The gate circuit part 340 outputs a gate signal to the pixel P. The gate signal controls a charging time of the data voltage. The gate circuit part 340 may be mounted on the display panel 310 as a chip type, or directly integrated on the display panel 310 with a thin film transistor in forming the thin film transistor of the display panel.

The light source module 400 emits light to the panel module 300. The light source module 400 includes a light source (not shown) emitting the light. The light source may include a fluorescent lamp or a light emitting diode (LED). The light source module 400 may be classified into a direct-illumination type or an edge-illumination type according to a position of the light source. For the edge-illumination type, the light source 400 may further include a light guide plate. In addition, the light source module 400 may be controlled to be synchronized with the panel module 300 and the lens panel 200.

The display apparatus 1000 may include a first connector 510 which electrically connects the controller 100 with the lens panel 200, a second connector 520 which electrically connects the controller 100 with the panel model 300, and a third connector 530 which electrically connects the controller 100 with the light source module 400. Each of the first connector 510, the second connector 520 and the third connector 530 may be a flexible printed circuit board (FPCB).

Figure 3:
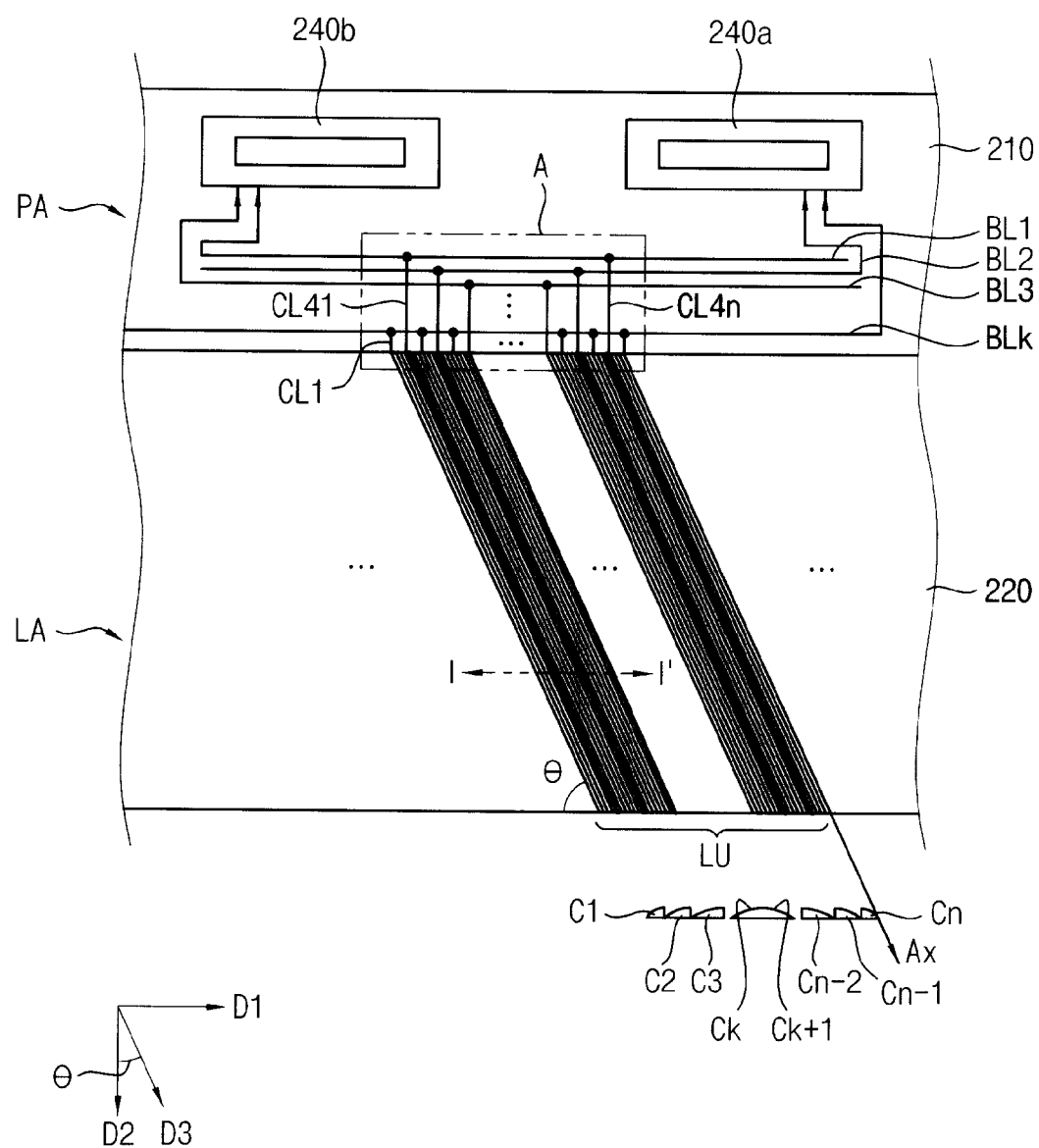
FIG. 3 is a plan view illustrating a lens panel in FIG. 1.
Figure 4:
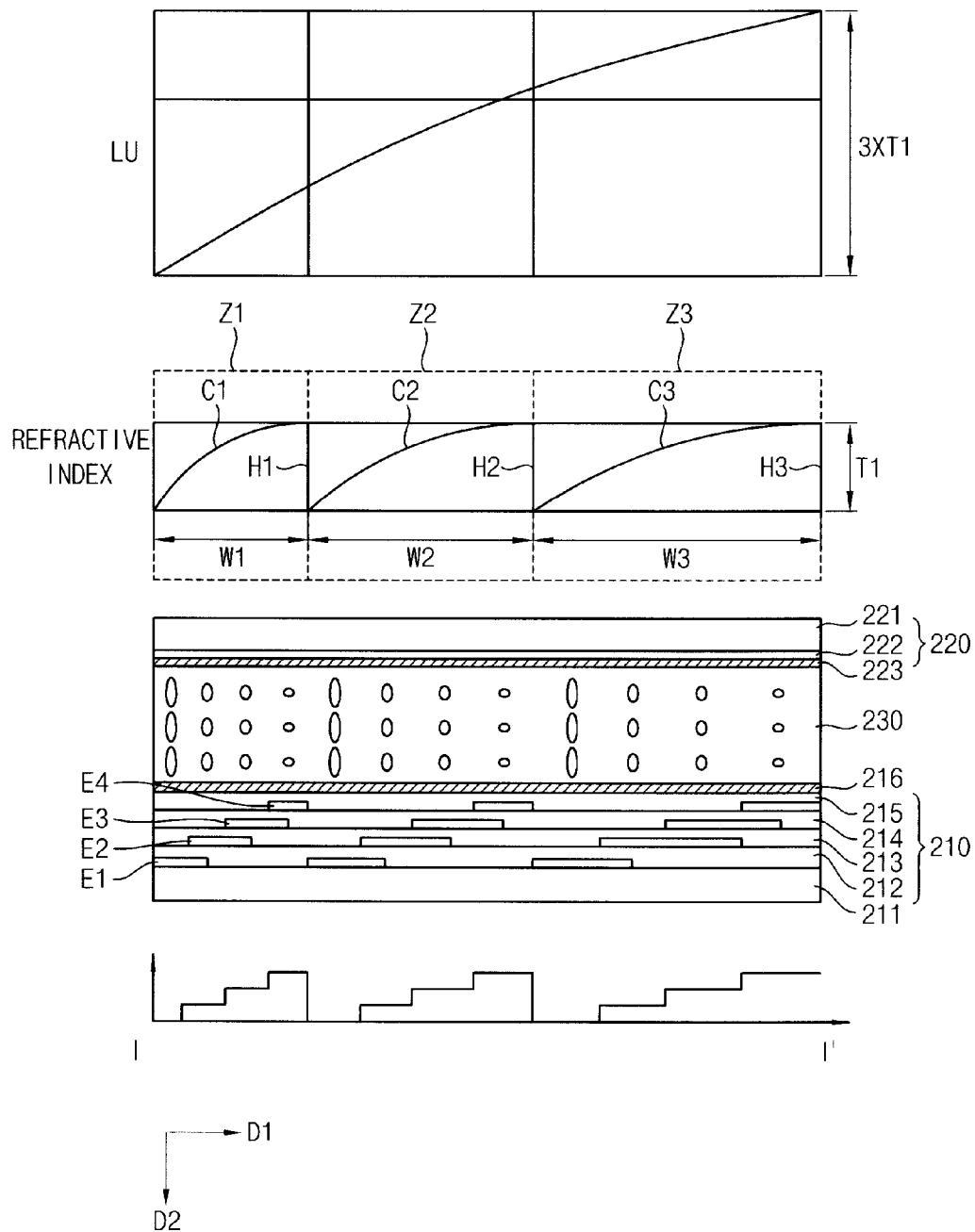
FIG. 4 is a cross-sectional view taken along a line I-I' of FIG. 3.

FIG. 3 is a plan view illustrating a lens panel in FIG. 1. FIG. 4 is a cross-sectional view taken along a line I-I' of FIG. 3. In FIG. 4, conceptual diagrams of the lens unit LU and a phase shift distribution of the lens unit LU are shown.

Referring to FIGS. 3 and 4, the lens panel 200 includes the first substrate 210, a second substrate 220 which is smaller than the first substrate 210 and faces the first substrate 210, a liquid crystal layer 230 disposed between the first and second substrates 210 and 220, and the lens driving circuit parts 240a and 240b. The lens panel 200 includes a lens area LA in which the lens units LU are disposed and a peripheral area PA formed adjacent to the lens area LA.

The lens area LA may form the lens units LU. Each of the lens units LU has a lens axis Ax. The lens axis Ax is inclined with respect to the second direction D2 by an inclined angle θ. The lens axis Ax of the Fresnel lens unit LU is substantially parallel with the third direction D3. Thus, the lens units LU of the lens panel 200 are disposed on the display panel 310 of the panel module 300 substantially parallel with each other along the lens axis Ax. In the present example embodiments, the lens axis Ax is inclined with respect to the second direction D2 by an inclined angle θ, but not limited thereto and the lens axis Ax may be variously changed. For example, the lens axis Ax may be substantially parallel with the second direction D2.

When voltages are applied to the lens panel 200, the lens panel 200 forms a phase shift distribution substantially same as the Fresnel lens which has a plurality of refractive areas Z1, Z2, Z3 . . . Zn−2, Zn−1 and Zn arranged along the first direction D1. Each of the refractive areas Z1, Z2, Z3 . . . Zn−2, Zn−1 and Zn includes each of circular arcs C1, C2, C3 . . . Cn−2, Cn−1 and Cn and each of discontinuity lines H1, H2, H3 . . . Hn−2, Hn−1 and Hn. Each of the discontinuity lines H1, H2, H3 . . . Hn−2, Hn−1 and Hn is formed at an end of each the circular arcs C1, C2, C3 . . . Cn−2, Cn−1 and Cn. In a Fresnel lens, a convex lens is divided into areas having a certain thickness and adopting circular arcs of the areas. Thus, a cell gap of the liquid crystal layer of the lens panel 200 which is driven as the Fresnel lens is decreased to be 1/K of a thickness of the convex lens. Here, K is equal to n/2, and n is the number of the circular arcs included in the Fresnel lens.

The first substrate 210 includes the first base substrate 211. The first electrode E1, a first insulating layer 212, the second electrode E2, a second insulating layer 213, the third electrode E3, a third insulating layer 214, the fourth electrode E4 and a fourth insulating layer 215 are sequentially formed on the first base substrate 211. The second electrodes E2 partially overlap with the first electrodes E1, respectively. The third electrodes E3 partially overlap with the second electrodes E2, respectively. The fourth electrodes E4 partially overlap with the third electrodes E3, respectively. Each of the refractive areas Zn includes one first electrode E1, one second electrode E2, one third electrode E3 and one fourth electrode E4. The first, second, third and fourth electrodes E1, E2, E3 and E4 are repetitively arranged in this order for each successive Zn.

The first, second, third and fourth electrodes E1, E2, E3 and E4 may include a transparent conductive oxide material, such as an indium tin oxide (ITO), an indium zinc oxide (IZO) and so on. The first, second, third and fourth insulating layer 212, 213, 214 and 215 may include an insulating material transmitting visible light, such as a silicon nitride (SiNx), a silicon oxide (SiOx), and so on.

A Fresnel lens is formed by dividing a convex lens into areas having a certain thickness, and is radially symmetric with respect to the center of the Fresnel lens. Thus, each of discontinuous lines H1, H2, H3 . . . Hn−2 and Hn−1, Hn has substantially the same length. However, each of widths W1, W2, W3 . . . Wn−2, Wn−1 and Wn along the first direction D1 of the refractive areas Z1, Z2, Z3 . . . Zn−2, Zn−1 and Zn increases as the refractive areas Z1, Z2, Z3 . . . Zn−2, Zn−1 and Zn approach the center of the Fresnel lens. Thus, each width of the first electrodes E1, each width of the second electrodes E2, each width of the third electrodes E3, and each width of the fourth electrodes E4 increase as the refractive areas Z1, Z2, Z3 . . . Zn−2, Zn−1 and Zn approach the center of the Fresnel lens. In addition, the widths of the first, second, third and fourth electrodes E1, E2, E3 and E4 may be substantially same as those of the first, second, third and fourth electrodes E1, E2, E3 and E4 in counter refractive areas Z1, Z2, Z3 . . . Zn−2, Zn−1 and Zn, which are symmetrical to the center of the Fresnel lens. In addition, the width of the fourth electrode E4 may be smaller than the widths of the first, second and third electrodes E1, E2 and E3 in the same refractive area Zn, so that the fourth electrode E4 may not overlap with the first electrode E1 in an adjacent refractive area Zn, and the discontinuity lines H1, H2, H3 . . . Hn−2, Hn−1 and Hn may be vertically formed with a steep slope.

A first alignment layer 216 is formed on the fourth insulating layer 215. The first alignment layer 216 has a first alignment direction, such that an initial alignment of the liquid crystal layer 230 is not twisted.

The second substrate 220 includes a second base substrate 221, a common electrode 222 and a second alignment layer 223.

The common electrode 222 is formed on the second base substrate 221. The common electrode 222 may include a transparent conductive oxide material, such as an indium tin oxide (ITO), an indium zinc oxide (IZO), and so on.

The second alignment layer 223 is formed on the second base substrate 221 on which the common electrode 221 is formed. The second alignment layer 223 has a second alignment direction, such that an initial alignment of the liquid crystal layer 230 is not twisted.

The liquid crystal layer 230 includes liquid crystal molecules. The liquid crystal molecules may be aligned in an anti-parallel alignment structure or a vertical alignment structure.

When appropriate driving voltages are applied to the lens panel 200, the arrangement of the liquid crystal molecules are changed to have a phase shift distribution substantially similar to a Fresnel lens.

For example, the first voltages provided from the lens driving circuit parts 240a and 240b are applied to the first electrodes E1, respectively. All of the first electrodes E1 may receive the first voltages substantially the same as each other. Each of the first voltages may be a ground voltage.

The fourth voltages provided from the lens driving circuit parts 240a and 240b are applied to the fourth electrodes E4, respectively. Each of the fourth electrodes E4 forming each of the refractive areas Z1, Z2, Z3 . . . Zn−2, Zn−1 and Zn may receive fourth voltages slightly different from each other. Thus, fourth voltages are adjusted according to positions of the fourth electrodes E4, adjacent electrodes and other elements to enhance characteristics of the lens units LU. In addition, the refractive areas Z1, Z2, Z3 . . . Zn−2, Zn−1 and Zn are symmetric with respect to the center of the Fresnel lens, so that the fourth electrodes E4 symmetrically located with respect to the center of the Fresnel lens may receive fourth voltages that are substantially the same. For example, the fourth electrode E4 included in the first refractive area Z1 and the fourth electrode E4 included in the N-th refractive area Zn, opposite to Z1, may receive fourth voltages substantially the same as each other.

The second and third electrodes E2 and E3 are electrically floated. The second and third electrodes E2 and E3 have voltages between the first voltage of the first electrode E1 and the fourth voltage of fourth electrode E4, respectively. The voltages of the second and third electrodes E2 and E3 may be adjusted based on overlapping areas between the first, second, third and fourth electrodes E1, E2, E3 and E4 and thicknesses of the first, second, third and fourth insulating layer 212, 213, 214 and 215. For example, the voltages of the second and third electrodes E2 and E3 electrically floated increase as the overlapping areas between the first, second, third and fourth electrodes E1, E2, E3 and E4 increase. In addition, the voltages of the second and third electrodes E2 and E3 electrically floated decrease as the thicknesses of the first, second, third and fourth insulating layer 212, 213, 214 and 215 increase.

Therefore, the voltages of the first, second, third and fourth electrodes E1, E2, E3 and E4 sequentially increase. For example, in one refractive area Zm, when the first electrode E1 receives about 0V and the fourth electrode E4 receives about 5V, the second electrode E2 has about 2.15V and the third electrode E3 has about 3.6V. However, in the region Zm+1 adjacent to rejoin Zm, the first and fourth electrode E1 and E4 have their voltages discontinuously decreased. Thus, the liquid crystal molecules disposed over each of the first electrodes E1 are vertically arranged, and the liquid crystal molecules disposed over each of the fourth electrodes E4 are horizontally arranged, so that the lens unit LU has a phase shift distribution substantially similar to the circular arcs C1, C2, C3 . . . Cn−2, Cn−1 and Cn of the Fresnel lens. In addition, the lens unit LU has a phase shift distribution substantially the same as the discontinuity lines H1, H2, H3 . . . Hn−2, Hn−1 and Hn of the Fresnel lens by the first and fourth electrodes E1 and E4 adjacent to each other. Thus, the lens panel 200 performs as a Fresnel lens.

According to the present example embodiment, the electrodes electrically floated are formed in two layers. Alternatively, the electrodes electrically floated may be formed in three or more layers.

Figure 5:
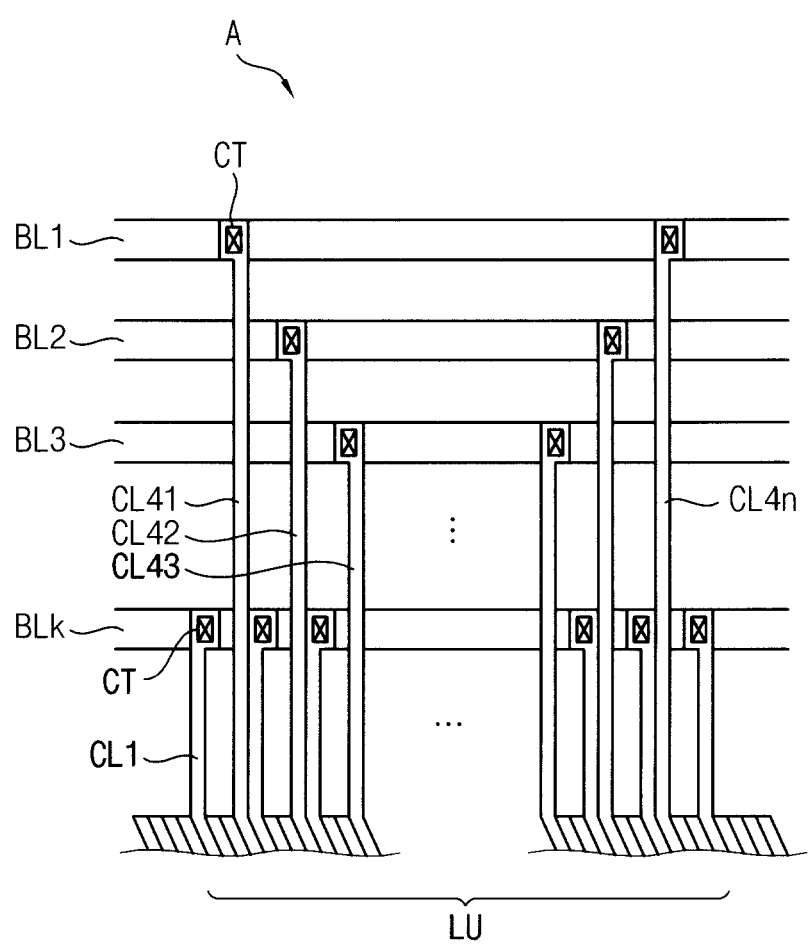
FIG. 5 is an enlarged plan view of a portion 'A' in FIG. 3.

FIG. 5 is an enlarged plan view of a portion 'A' in FIG. 3.

Referring to FIGS. 3 and 5, the peripheral area PA of the lens panel 200 is not covered with the second substrate 220. In the peripheral area PA, the lens driving circuit parts 240a and 240b, a plurality of bus lines BL1, BL2 . . . BLk, a plurality of first electrode lines CL1 and a plurality of fourth electrode lines CL41, CL42 . . . CL4n are formed. Here, K is equal to n/2, and n is the number of the circular arcs included in the Fresnel lens. However, a line structure illustrated in FIG. 5 is an example embodiment of the present invention, and alternatively, the bus lines and the electrode lines may be changed.

The bus lines BL1, BL2 . . . BLk may extend along the first direction D1, and the first electrode lines CL1 and the fourth electrode lines CL41, CL42 . . . CL4n may extend along the second direction D2. The first electrode lines CL1 and the fourth electrode lines CL41, CL42 . . . CL4n partially overlap with the bus lines BL1, BL2 . . . BLk, and may be alternately arranged along the first direction D1. The first electrode lines CL1 extend from each of the first electrodes E1, and the fourth electrode lines CL41, CL42 ... CL4n extend from each of the fourth electrodes E4.

The first electrode lines CL1 are connected to the k-th bus line BLk through contact holes CT. The k-th bus line BLk may transmit ground voltage.

Each of the fourth electrodes E4 forming each of the refractive areas Z1, Z2, Z3 ... Zn-2, Zn-1 and Zn receive the fourth voltages slightly different from each other, so that each of the fourth electrode lines CL41, CL42 ... CL4n is connected to the first, second and third bus lines BL1, BL2, BL3 ..., respectively. In addition, the refractive areas Z1, Z2, Z3 ... Zn-2, Zn-1 and Zn are distributed symmetrically with respect to the center of the Fresnel lens, so that the fourth electrode lines CL41 and CL4n connected to the fourth electrodes E4 symmetrically located are connected to the same bus line BL1.

In the 3D mode, the lens driving circuit parts 240a and 240b respectively supply the first and fourth voltages to the first and fourth electrodes E1 and E4 through the bus lines BL1, BL2 ... BLk, the first electrode lines CL1 and the fourth electrode lines CL41, CL42 ... CL4n. Each of the lens driving circuit parts 240a and 240b are alternately connected to the bus lines BL1, BL2 ... BLk. For example, the first lens driving circuit part 240a may be connected to the odd-numbered bus lines BL1, BL3 ... and the second lens driving circuit part 240b may be connected to the even-numbered bus lines BL2, BL4 ....

Figure 6:
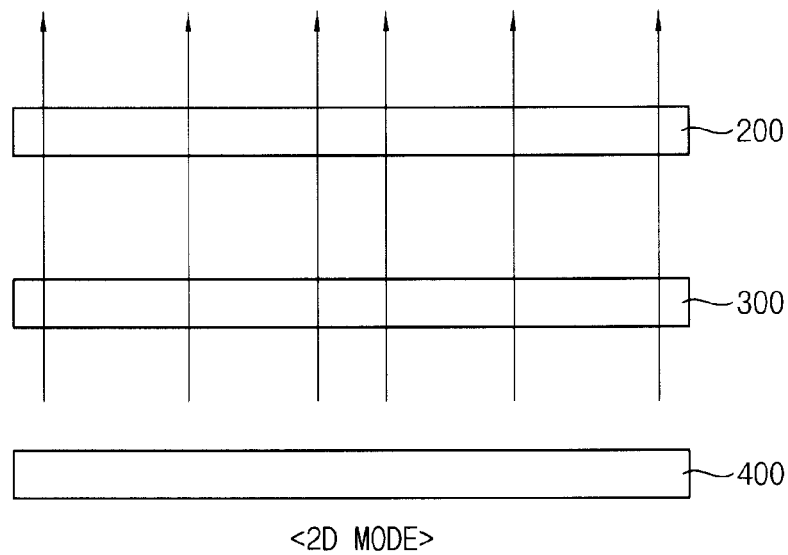
FIG. 6 is a conceptual diagram illustrating a display of a 2D image by the display apparatus in FIG. 1.

FIG. 6 is a conceptual diagram illustrating a display of a 2D image by the display apparatus in FIG. 1.

Referring to FIGS. 1 and 6, the light source module 400 generates light.

The light generated from the light source module 400 is provided to the display panel 310. Thus, the display panel 310 displays the 2D image.

The light passing through the display panel 310 is provided to the lens panel 200. In this case, the driving voltages are not provided to the lens panel 200. The liquid crystal molecules of the lens panel 200 maintain an initial alignment state, and the light passing through the display panel 310 is transmitted without refraction by the lens panel 200.

Thus, the display apparatus 1000 may display the 2D image.

Figure 7:
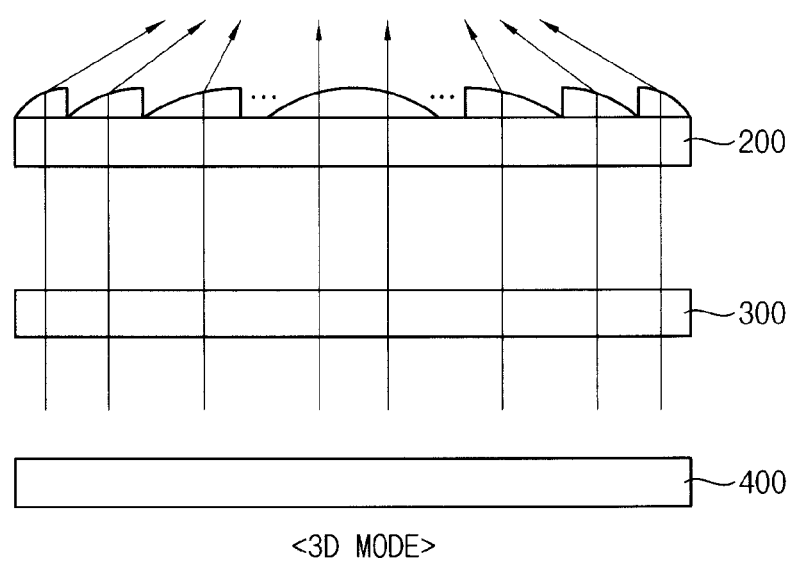
FIG. 7 is a conceptual diagram illustrating a display of a 3D stereoscopic image by the display apparatus in FIG. 1.
Figure 8:
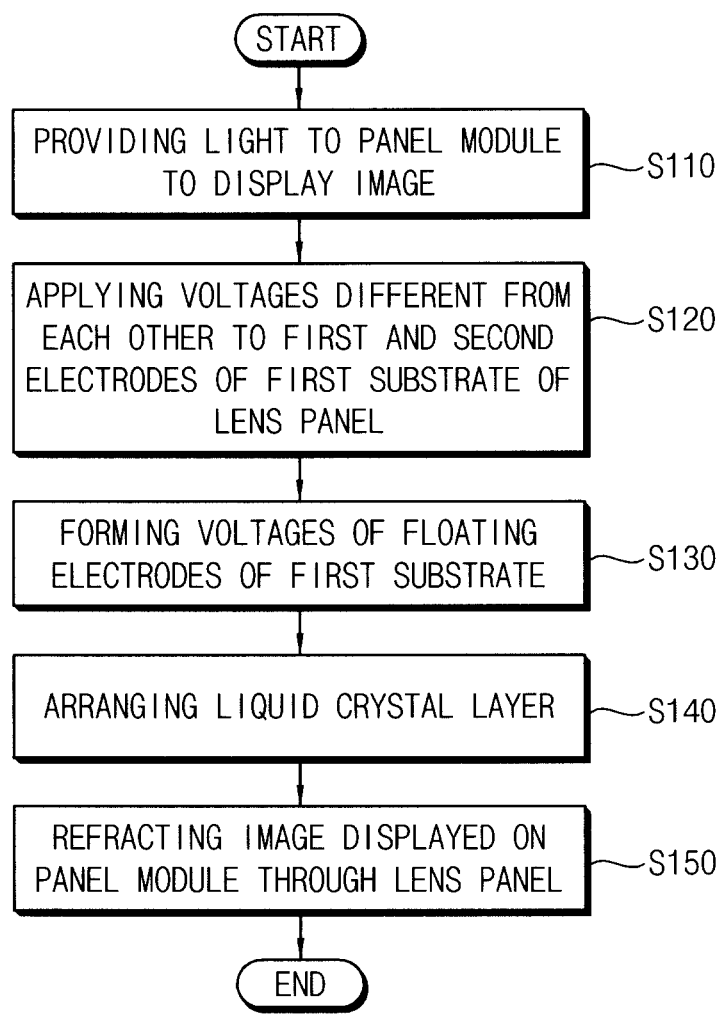
FIG. 8 is a flow chart explaining a method of driving the display apparatus in FIG. 1, when the display apparatus displays the 3D stereoscopic image.

FIG. 7 is a conceptual diagram illustrating a display of a 3D stereoscopic image by the display apparatus in FIG. 1. FIG. 8 is a flow chart explaining a method of driving the display apparatus in FIG. 1 when the display apparatus displays the 3D stereoscopic image.

Referring to FIGS. 1 and 7, the light source module 400 generates light.

The light generated from the light source module 400 is provided to the display panel 310. Thus, the display panel 310 displays the 3D stereoscopic image (step S110).

The light passing through the display panel 310 is provided to the lens panel 200. To display the 3D stereoscopic image, the first and fourth voltages are respectively provided to the first and fourth electrodes E1 and E4 of the lens panel 200 (step S120). The first and fourth voltages may be different from each other.

The second and third electrodes E2 and E3 electrically floated have voltages between the first and fourth voltages by the first and fourth voltages applied to the first and fourth electrodes E1 and E4 (step S130).

The liquid crystal molecules of the lens panel 200 are rearranged to have a phase shift distribution as the Fresnel lens, and each of the lens units LU is driven as the Fresnel lens (step S140). Thus, the light passing through the display panel 310 is refracted by the lens panel 200 (step S150).

Thus, the display apparatus displays the 3D stereoscopic image.

According to the present example embodiment, the lens unit of the lens panel is driven as a Fresnel lens, so that a cell gap of the lens panel is decreased. Thus, manufacturing efficiency is improved, and manufacturing cost is reduced.

The number of the bus lines and electrode lines formed in a peripheral area of the lens panel is decreased due to forming a plurality of electrodes electrically floated in the lens panel, so that resistors and disconnection of the bus lines or the electrode lines are decreased. In addition, the spacing between the bus lines or the electrode lines is increased, so that the manufacturing process is much easier.

The fourth electrodes respectively receive the fourth voltages slightly different from each other, and the fourth voltages are adjusted according to positions of the fourth electrodes, adjacent electrodes and other elements to enhance a characteristic of the lens unit.

Figure 9:
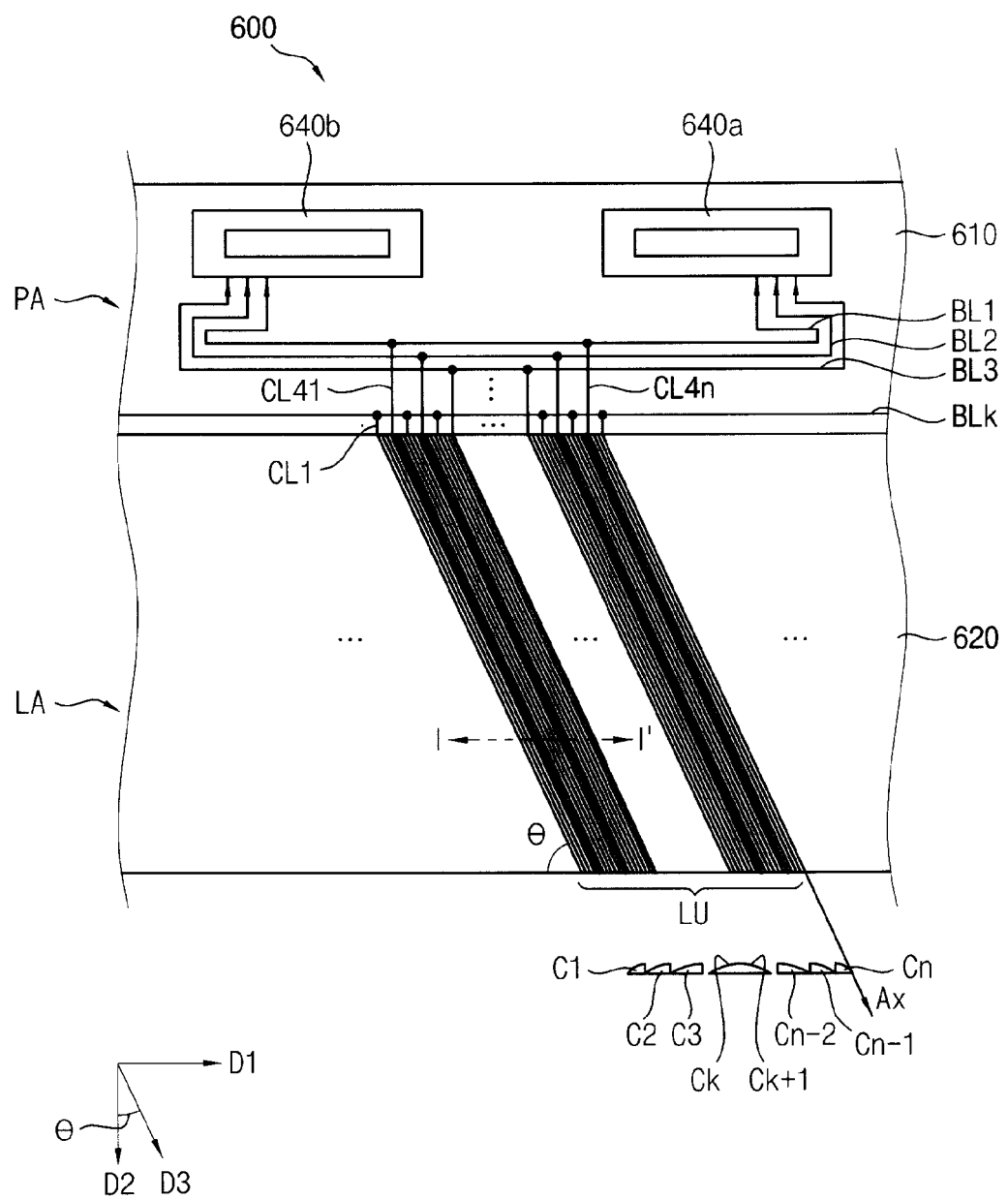
FIG. 9 is a plan view illustrating a lens panel according to another example embodiment of the present invention.

FIG. 9 is a plan view illustrating a lens panel according to another example embodiment of the present invention.

A lens panel according to the present example embodiment is substantially the same as the lens panel according to the previous example embodiment described referring to FIGS. 1 to 7 except for a peripheral area of the lens panel, so that the same reference numerals will be used to refer to the same or like parts as those described in the previous example embodiment and thus any repetitive explanation concerning the above elements will be omitted or briefly described.

Referring to FIG. 9, the lens panel 600 includes the first substrate 610, a second substrate 620 which is smaller than the first substrate 610 and faces the first substrate 610, a liquid crystal layer (not shown) disposed between the first and second substrates 610 and 620, and the lens driving circuit parts 640a and 640b.

The lens panel 600 includes a lens area LA in which the lens units LU are disposed and a peripheral area PA adjacent to one side of the lens area LA. When voltages are applied to the lens panel 600, the lens panel 600 forms a phase shift distribution substantially same as the Fresnel lens which has a plurality of refractive areas.

The peripheral area PA includes the lens driving circuit parts 640a and 640b, a plurality of bus lines BL1, BL2 ... BLk, a plurality of first electrode lines CL1 and a plurality of fourth electrode lines CL41, CL42 ... CL4n. Here, K is equal to n/2, and n is the number of the circular arcs included in the Fresnel lens. However, a line structure illustrated in FIG. 9 is an example embodiment of the present invention, and alternatively, the bus lines and the electrode lines may be changed.

A method for displaying the 3D stereoscopic image of the display apparatus according to the present example embodiment is substantially the same as method for displaying the 3D stereoscopic image of the display apparatus according to the previous example embodiment described referring to FIG. 7, and thus any repetitive explanation concerning the above elements will be omitted or briefly described.

In the 3D mode, the lens driving circuit parts 640a and 640b respectively supply the first and fourth voltages to the first and fourth electrodes E1 and E4 through the bus lines BL1, BL2 ... BLk, the first electrode lines CL1 and the fourth electrode lines CL41, CL42 ... CL4n. Each of the lens driving circuit parts 640a and 640b are connected to all bus lines BL1, BL2 ... BLk. Thus, the bus lines BL1, BL2 ... BLk receive the first and fourth voltages from the lens driving circuit parts 640a and 640b connected to both ends of the bus lines BL1, BL2 ... BLk at the same time. The fourth voltage is larger than the first voltage. Each of the first voltages may be the ground voltage.

According to the present example embodiments, the lens unit of the lens panel is driven as a Fresnel lens, so that a cell gap of the lens panel is decreased. Thus, its manufacturing efficiency is enhanced, and its manufacturing cost is reduced.

The number of bus lines and electrode lines formed in a peripheral area of the lens panel may be reduced due to forming a plurality of electrodes electrically floated in the lens panel, so that resistors and disconnection of the bus lines or the electrode lines are decreased. In addition, the spacing between the bus lines or the electrode lines is increased, so that their manufacturing process is much easier.

The fourth electrodes respectively receive the fourth voltages slightly different from each other, and the fourth voltages are adjusted according to positions of the fourth electrodes, adjacent electrodes and other elements to enhance a characteristic of the lens unit.

The bus lines receive the first and fourth voltages from the lens driving circuit connected to both ends of the bus lines at the same time, so that the signal delay is decreased. Thus, even though a size of the display apparatus increases, the display quality is prevented from being deteriorated.

Figure 10:
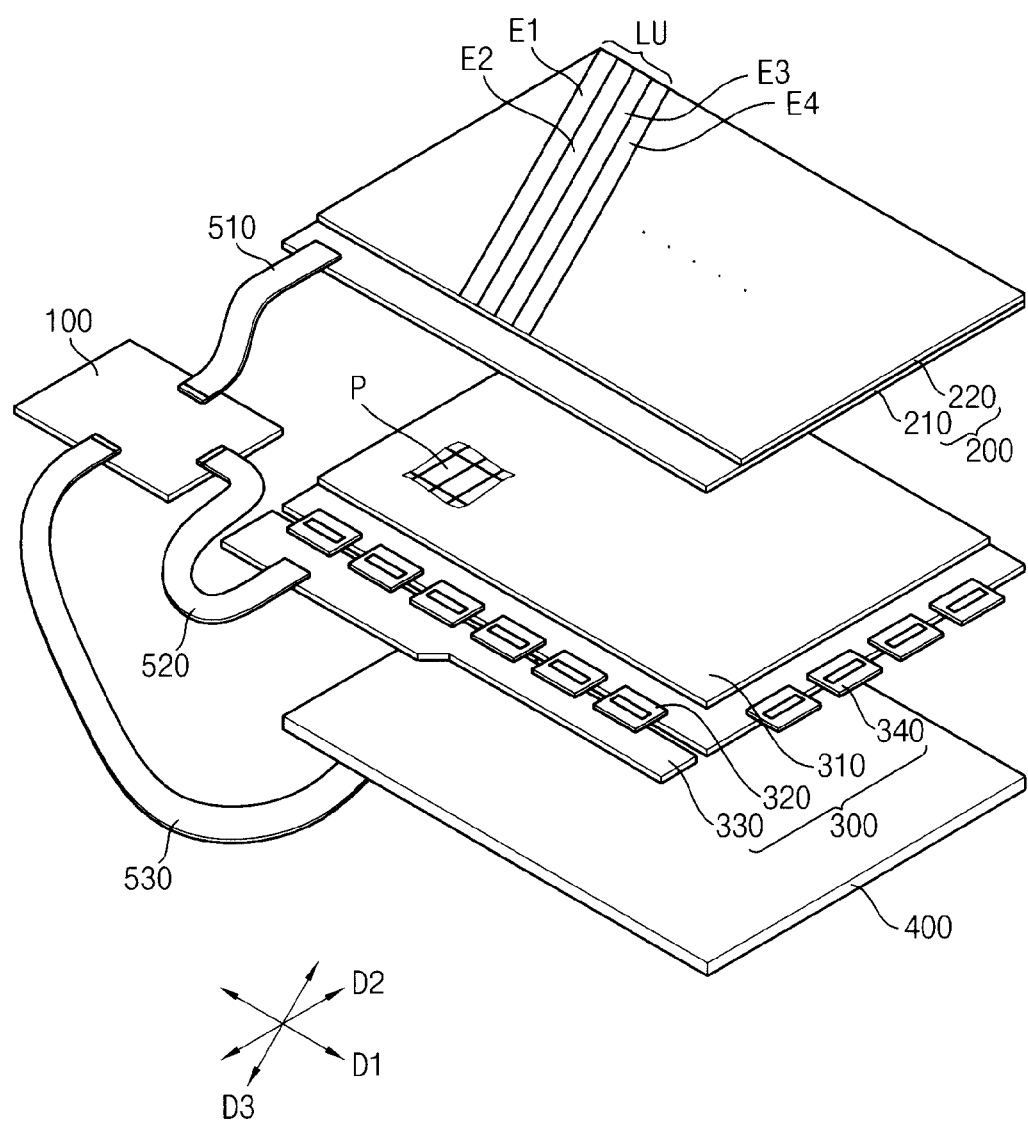
FIG. 10 is an exploded perspective view illustrating a display apparatus according to still another example embodiment of the present invention.
Figure 11:
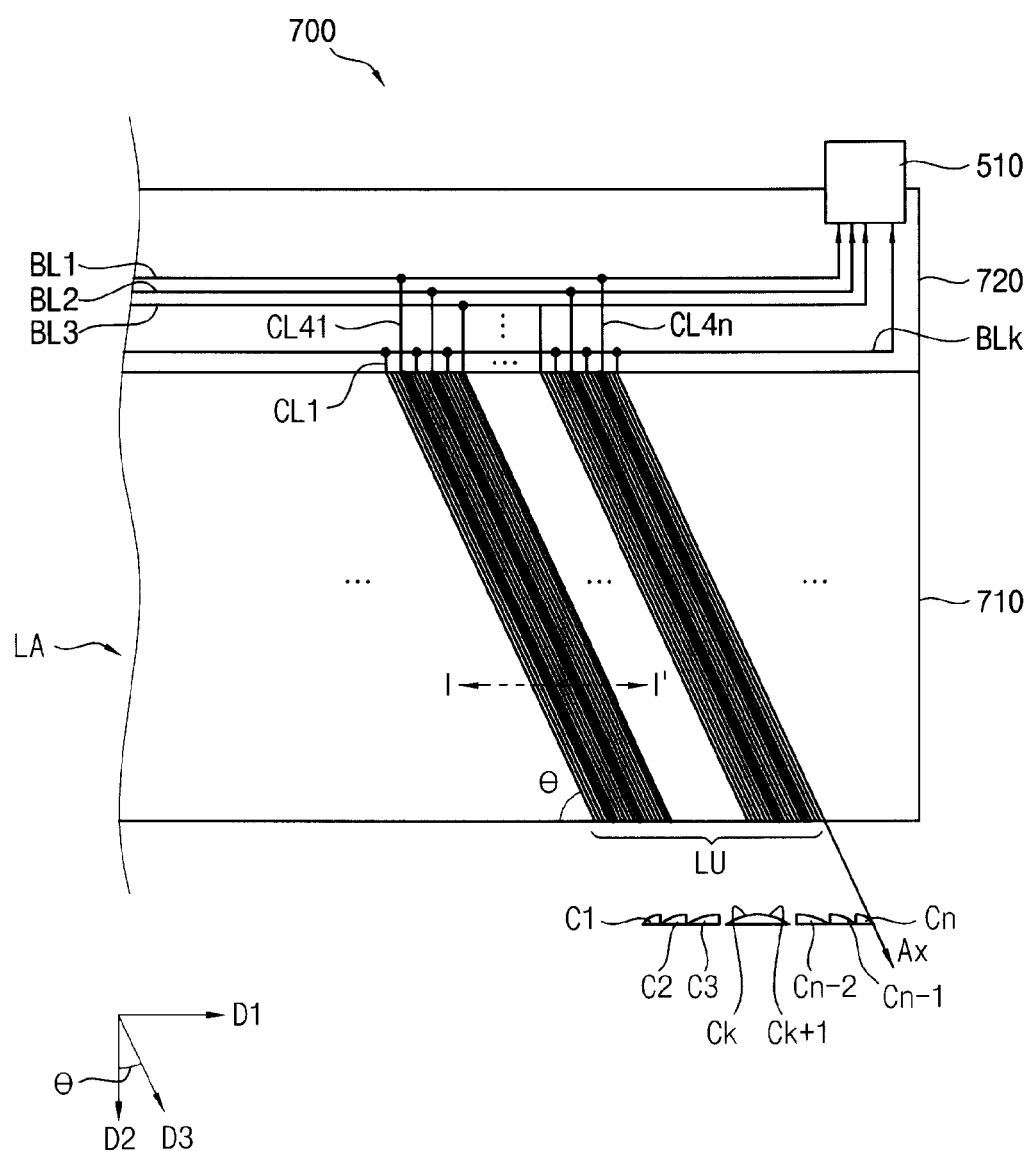
FIG. 11 is a plan view illustrating a lens panel in FIG. 10.

FIG. 10 is an exploded perspective view illustrating a display apparatus according to still another example embodiment of the present invention. FIG. 11 is a plan view illustrating a lens panel in FIG. 10.

A lens panel according to the present example embodiment is substantially the same as the lens panel according to the previous example embodiment described referring to FIGS. 1 to 7 except for a peripheral area of the lens panel, so that the same reference numerals will be used to refer to the same or like parts as those described in the previous example embodiment and thus any repetitive explanation concerning the above elements will be omitted or briefly described.

Referring to FIGS. 10 and 11, the lens panel 700 includes a first substrate 710, a second substrate 720 which is smaller than the first substrate 710 and faces the first substrate 710, and a liquid crystal layer (not shown) disposed between the first and second substrates 710 and 720. The first substrate 710 is connected to the first connector 510 to receive the driving voltages.

The first substrate 710 includes a lens area LA in which the lens units LU are disposed, and a peripheral area PA adjacent to one side of the lens area LA. When voltages are applied to the lens panel 700, each of the lens unit LU forms a phase shift distribution substantially same as the Fresnel lens which has a plurality of refractive areas.

The peripheral area PA of the lens panel 700 is not covered with the second substrate 720. The peripheral area PA includes a plurality of bus lines BL1, BL2 ... BLk, a plurality of first electrode lines CL1 and a plurality of fourth electrode lines CL41, CL42 ... CL4n. Here, K is equal to n/2, and n is the number of the circular arcs included in the Fresnel lens. However, a line structure illustrated in FIGS. 10 and 11 is an example embodiment of the present invention, and alternatively, the bus lines and the electrode lines may be changed variously.

A method for displaying the 3D stereoscopic image of the display apparatus according to the present example embodiment is substantially the same as the method for displaying the 3D stereoscopic image of the display apparatus according to the previous example embodiment described referring to FIGS. 1 to 7, and thus any repetitive explanation concerning the above elements will be omitted or briefly described.

In the 3D mode, the first connector 510 supplies the first and fourth voltages to the first and fourth electrodes E1 and E4 through the bus lines BL1, BL2 ... BLk, the first electrode lines CL1 and the fourth electrode lines CL41, CL42 ... CL4n. Each of the lens driving circuit parts 640a and 640b are connected to all bus lines BL1, BL2 ... BLk. The first connector 510 may be directly connected to the bus lines BL1, BL2 ... BLk. The first connector 510 may be a FPCB.

According to the present example embodiments, each of the lens units of the lens panel is driven as the Fresnel lens, so that a cell gap of the lens panel is decreased. Thus, manufacturing efficiency is enhanced, and manufacturing cost is decreased.

The number of the bus lines and electrode lines formed in a peripheral area of the lens panel is decreased due to forming a plurality of electrodes electrically floated in the lens panel, so that resistors and disconnection of the bus lines or the electrode lines are decreased. In addition, the spacing between the bus lines or the electrode lines is increased, so that the manufacturing process is much easier.

The lens panel receives the driving voltages from the connector like a FPCB without a driving circuit including chips such as a driving IC chip, so that the manufacturing cost is decreased.

Figure 12:
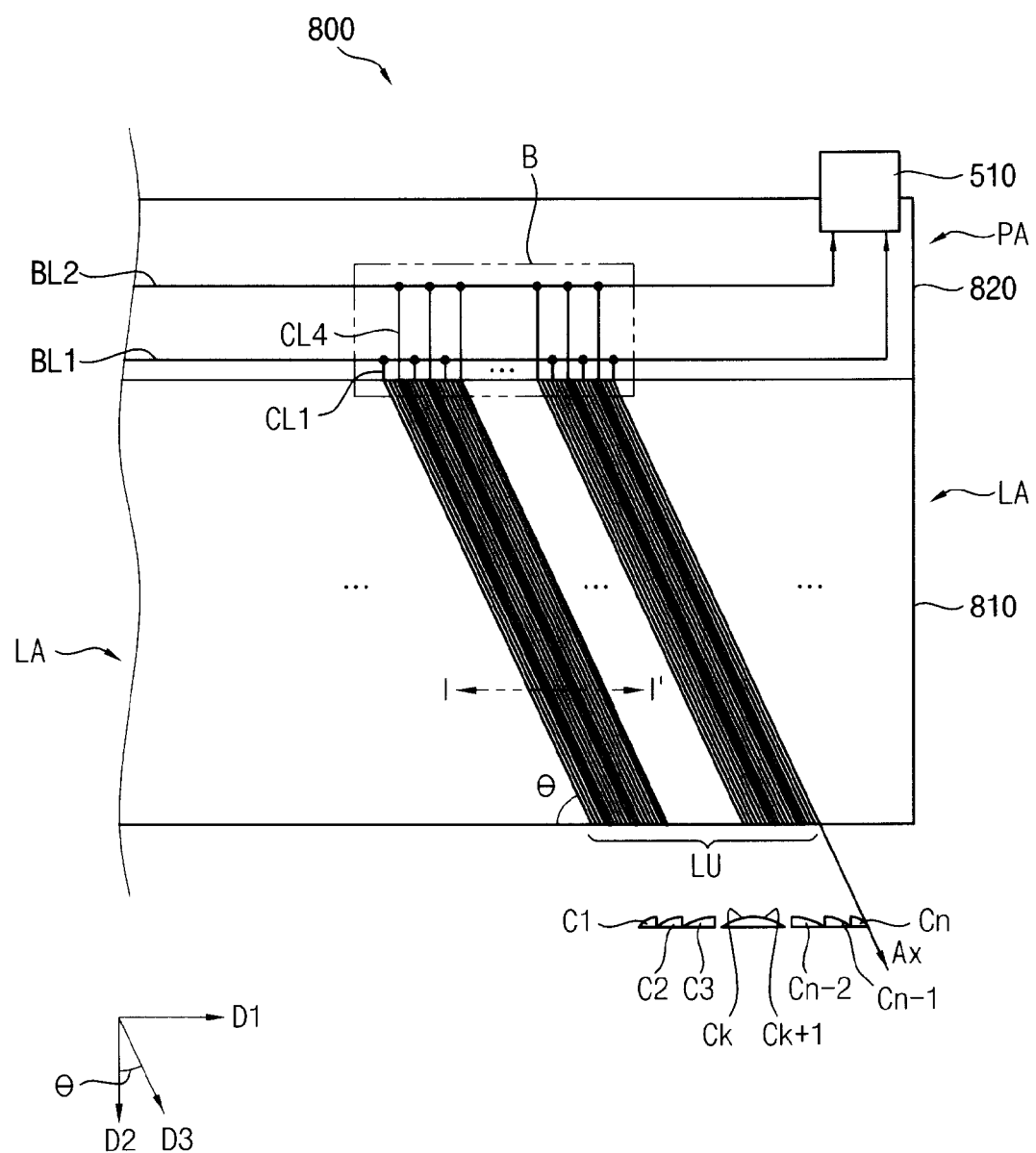
FIG. 12 is a plan view illustrating a lens panel according to still another example embodiment of the present invention.
Figure 13:
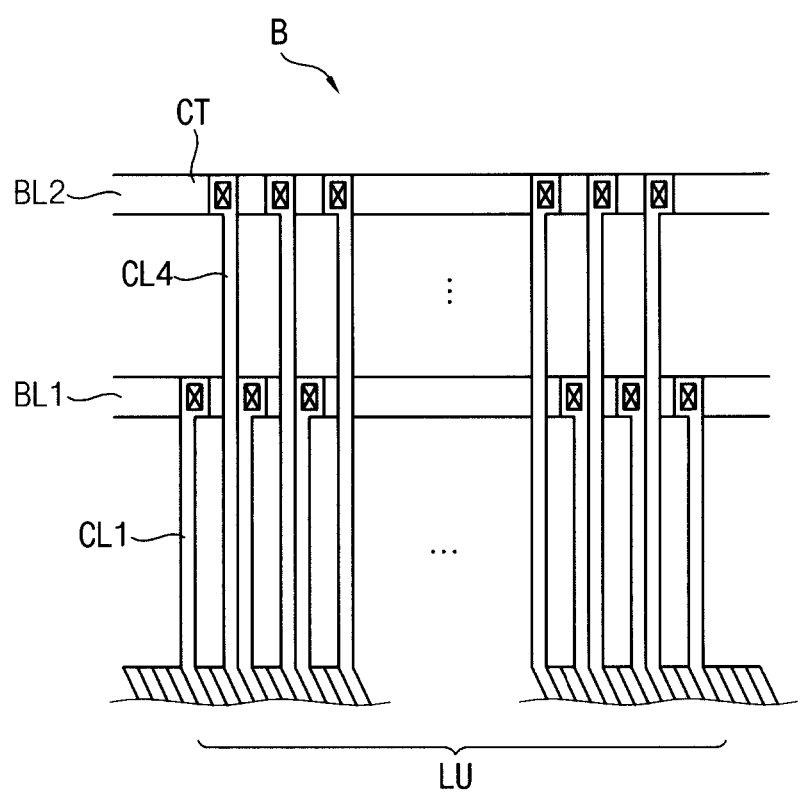
FIG. 13 is an enlarged perspective view of a portion 'B' in FIG. 12.

FIG. 12 is a plan view illustrating a lens panel according to still another example embodiment of the present invention. FIG. 13 is an enlarged perspective view of a portion 'B' in FIG. 12

A lens panel according to the present example embodiment is substantially the same as the lens panel according to the previous example embodiment described referring to FIGS. 10 and 11 except for a peripheral area of the lens panel, so that the same reference numerals will be used to refer to the same or like parts as those described in the previous example embodiment and thus any repetitive explanation concerning the above elements will be omitted or briefly described.

Referring to FIGS. 12 and 13, the lens panel 800 includes a first substrate 810, a second substrate 820 which is smaller than the first substrate 810 and faces the first substrate 810, and a liquid crystal layer (not shown) disposed between the first and second substrates 810 and 820. The first substrate 810 is connected to the first connector 510 to receive the driving voltages.

The first substrate 810 includes a lens area LA having the lens units LU and a peripheral area PA adjacent to one side of the lens area LA. When voltages are applied to the lens panel 800, each of the lens unit LU forms a phase shift distribution substantially same as the Fresnel lens which has a plurality of refractive areas.

The peripheral area PA of the lens panel 800 is not covered with the second substrate 820. The peripheral area PA includes first and second bus lines BL1 and BL2, a plurality of first electrode lines CL1 and a plurality of fourth electrode lines CL4. Here, K is equal to n/2, and n is the number of the circular arcs included in the Fresnel lens.

The first electrode lines CL1 are connected to the first bus line BL1 through contact holes CT. The first electrodes E1 may receive the first voltages substantially the same with each other through the first electrodes lines CL1. For example, the first electrodes E1 may receive the ground voltage through the first electrodes lines CL1 and the first bus line BL1.

The fourth electrode lines CL4 are connected to the second bus line BL2 through contact holes CT.

A method for displaying the 3D stereoscopic image of the display apparatus according to the present example embodiment is substantially the same as a method for displaying the 3D stereoscopic image of the display apparatus according to the previous example embodiment described referring to FIGS. 1 to 7, and thus any repetitive explanation concerning the above elements will be omitted or briefly described.

In the 3D mode, the first connector 510 supplies the first and fourth voltages to the first and fourth electrodes E1 and E4 through the first and second bus lines BL1 and BL2, the first electrode lines CL1 and the fourth electrode lines CL4 respectively. The fourth electrodes E4 receive the fourth voltages substantially the same with each other, and the fourth voltage is larger than the first voltage.

The first connector 510 may be directly connected to the first and second bus lines BL1 and BL2. The first connector 510 may be a FPCB.

According to the present example embodiments, the lens unit of the lens panel is driven as the Fresnel lens, so that a cell gap of the lens panel is decreased. Thus, manufacturing efficiency is enhanced, and manufacturing cost is reduced.

The number of the bus lines and electrode lines formed in a peripheral area of the lens panel is decreased due to forming a plurality of electrodes electrically floated in the lens panel, so that resistors and disconnection of the bus lines or the electrode lines are decreased. In addition, the spacing between the bus lines or the electrode lines may be increased, so that the manufacturing process is much easier.

The lens panel receives the driving voltages from a connector like a FPCB without a driving circuit including chips such as a driving IC chip, so that manufacturing cost is decreased.

According to the present invention, the lens unit of the lens panel is driven as a Fresnel lens, so that a cell gap of the lens panel is decreased. Thus, its manufacturing efficiency is enhanced, and its manufacturing cost is decreased.

Some electrodes of the lens panel maintain an electrically floated state, and voltages of the electrically floated electrodes are formed by adjusting overlapping areas between the electrodes and thicknesses of the insulating layers.

Accordingly, the number of the lines applying voltages to the lens panel is decreased, so that the manufacturing process may be simplified, and the manufacturing cost may be decreased. Thus, the display apparatus may be efficiently manufactured.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. A display apparatus comprising:
   a panel module displaying a 2-dimensional (2D) image or a 3-dimensional (3D) stereoscopic image; and
   a lens panel disposed over the panel module and including a first substrate, a second substrate opposite to the first substrate and a liquid crystal layer disposed between the first substrate and the second substrate, the first substrate including a first plurality of first electrodes, a second plurality of floating electrodes and a third plurality of second electrodes, the first electrodes being disposed on a first plane, the floating electrodes partially overlapping with the first electrodes and being electrically floated, the second electrodes being disposed on a second plane different from the first plane and partially overlapping with the floating electrodes.

2. The display apparatus of claim 1, wherein a voltage applied to each of the first electrodes is smaller than a voltage applied to each of the second electrodes.

3. The display apparatus of claim 1, wherein the first substrate comprises: a first insulating layer formed between the first electrodes and the floating electrodes; and a second insulating layer formed between the second electrodes and the floating electrodes.

4. The display apparatus of claim 3, wherein voltages of the floating electrodes are between a voltage applied to each of their respective first electrodes and a voltage applied to each of their respective second electrodes.

5. The display apparatus of claim 4, wherein the voltages of the floating electrodes are established at least based on the amount of overlap between the first electrodes and the floating electrodes or between the second electrodes and the floating electrodes.

6. The display apparatus of claim 4, wherein the voltages of the floating electrodes are established at least based on the thickness of the first insulating layer or the second insulating layer.

7. The display apparatus of claim 1, wherein the lens panel further comprises:
   a lens driving circuit formed on at least one side of the first substrate; and
   a plurality of bus lines connected to the lens driving circuit and transmitting voltages to the first electrodes and the second electrodes.

8. The display apparatus of claim 7, wherein at least two of the second electrodes are connected to different bus lines.

9. The display apparatus of claim 8, wherein the lens driving circuit includes first and second driving circuits, and the bus lines are alternately connected to the first and second driving circuits.

10. The display apparatus of claim 8, wherein the lens driving circuit includes a plurality of driving circuits, and the bus lines are connected to all of the driving circuits.

11. The display apparatus of claim 1, wherein the lens panel further comprises:
    a plurality of bus lines electrically connected to an external circuit substrate, and transmitting voltages to the first and second electrodes.

12. The display apparatus of claim 11, wherein at least two second electrodes are electrically connected to the bus lines different from each other.

13. The display apparatus of claim 11, wherein the second electrodes are electrically connected to substantially the same bus line.

14. The display apparatus of claim 1, further comprising a fourth plurality of the first electrodes, a fifth plurality of the floating electrodes, and a sixth plurality of the second electrodes, wherein the first electrodes, the-second electrodes and the-floating electrodes form a plurality of lens units,
    the fourth plurality of the first electrodes, the fifth plurality of the floating electrodes, and the sixth plurality of the second electrodes are located closer to a center of each of the lens units than the first plurality of the first electrodes, the second plurality of the floating electrodes, and the third plurality of the second electrodes are located, and
    the widths of the shorter sides of the fourth plurality of the first electrodes, the sixth plurality of the second electrodes and the fifth plurality of the floating electrodes are less than the widths of the first plurality of the first electrodes, the third plurality of the second electrodes and the second plurality of the floating electrodes, respectively.

15. The display apparatus of claim 1, wherein the width of the shorter side of each of the second electrodes is shorter than that of each of the corresponding first electrodes.

16. The display apparatus of claim 1, further comprising a light source module configured to supply light to the panel module.

17. The display apparatus of claim 16, wherein the first substrate comprises:
a first insulating layer formed between the first electrodes and the floating electrodes; and
a second insulating layer formed between the second electrodes and the floating electrodes.

18. The display apparatus of claim 16, wherein the lens panel further comprises:
a lens driving circuit formed on at least one side of the first substrate; and
a plurality of bus lines connected to the lens driving circuit and transmitting voltages to the first electrodes and the second electrodes.

19. The display apparatus of claim 18, wherein at least two of the second electrodes are connected to different bus lines.

20. The display apparatus of claim 19, wherein the lens driving circuit includes first and second driving circuits, and the bus lines are alternately connected to the first and second driving circuits.

21. The display apparatus of claim 19, wherein the lens driving circuit includes a plurality of driving circuits, and the bus lines are connected to all of the driving circuits.

22. The display apparatus of claim 16, wherein the lens panel further comprises:
a plurality of bus lines electrically connected to an external circuit substrate, and transmitting voltages to the first and second electrodes.

23. The display apparatus of claim 22, wherein at least two second electrodes are electrically connected to the bus lines different from each other.

24. The display apparatus of claim 22, wherein the second electrodes are electrically connected to substantially the same bus line.

25. The display apparatus of claim 1, wherein the floating electrodes include first floating electrodes disposed on a third plane and second floating electrodes disposed on a fourth plane different from the third plane.

26. The display apparatus of claim 25, wherein
the first floating electrodes partially overlap with the first electrodes,
the second floating electrodes partially overlap with the first floating electrodes, and
the second electrodes partially overlap with the second floating electrodes.

27. A method for driving a display apparatus, the method comprising:
applying voltages different from each other to first electrodes and second electrodes of the lens panel, the lens panel being disposed over the panel module, the first electrodes being disposed on a first plane, the second electrodes being disposed on a second plane different from the first plane;
applying voltages to a plurality of floating electrodes of a first substrate wherein the voltages applied depend on the voltages applied to the first electrodes and the second electrodes, the floating electrodes partially overlapping with the first electrodes, partially overlapping with the second electrodes and being electrically floated;
changing an arrangement of liquid crystal molecules of a liquid crystal layer of the lens panel, the liquid crystal layer being disposed between the first substrate and a second substrate; and
refracting an image provided from the panel module in passing through the liquid crystal layer of the lens panel.

28. The method of claim 27, wherein changing the arrangement of the liquid crystal molecules of the liquid crystal layer comprises:
forming an electric field between the first electrodes, the floating electrodes and the second electrodes of the first substrate and a common electrode of the second substrate.

29. The method of claim 27, wherein the voltage applied to each of the first electrodes is smaller than the voltage applied to each of the corresponding second electrodes, and the voltages of the floating electrodes are between the voltage applied to the first electrode and the voltage applied to the second electrode.

30. The method of claim 27, wherein at least two voltages applied to the second electrodes are different from each other.

31. The method of claim 27, wherein the voltages applied to the second electrodes are substantially the same.

32. The method of claim 27, further comprising providing light from a light source module to the panel module to display the image.

* * * * *